United States Patent [19]

Nielsen et al.

[11] Patent Number: 5,689,177
[45] Date of Patent: Nov. 18, 1997

[54] METHOD AND APPARATUS TO REGULATE A VOLTAGE CONTROLLER

[75] Inventors: Michael H. Nielsen, The Woodlands, Tex.; Alan D. Berger; Vinton P. Coffman, both of Pittsburgh, Pa.

[73] Assignee: The Babcock & Wilcox Company, New Orleans, La.

[21] Appl. No.: 584,195

[22] Filed: Jan. 11, 1996

[51] Int. Cl.[6] ............................................. G06F 1/10
[52] U.S. Cl. ............................................. 323/241
[58] Field of Search ........................ 323/237, 239, 323/241; 363/54, 57, 85, 96, 128, 135

[56] References Cited

U.S. PATENT DOCUMENTS

| | | | |
|---|---|---|---|
| 3,504,480 | 4/1970 | Copcutt et al. | 55/112 |
| 4,262,260 | 4/1981 | Tamura | 330/109 |
| 4,290,003 | 9/1981 | Lanese | 323/241 |
| 4,354,152 | 10/1982 | Herklotz et al. | 323/241 |
| 4,587,475 | 5/1986 | Finney, Jr. et al. | 323/241 |
| 4,592,763 | 6/1986 | Dietz et al. | 55/2 |
| 4,626,260 | 12/1986 | Jorgensen | 55/2 |
| 4,659,342 | 4/1987 | Lind | 55/2 |
| 4,670,829 | 6/1987 | Dallhammer et al. | 363/57 |
| 4,704,672 | 11/1987 | Gustafsson | 363/86 |
| 4,772,998 | 9/1988 | Guenther et al. | 363/128 |
| 4,860,149 | 8/1989 | Johnston | 361/79 |
| 4,996,471 | 2/1991 | Gallo | 323/241 |
| 5,311,420 | 5/1994 | Zarfoss et al. | 364/148 |
| 5,378,978 | 1/1995 | Gallo et al. | 323/241 |
| 5,515,262 | 5/1996 | Johnston et al. | 363/90 |

*Primary Examiner*—Matthew V. Nguyen
*Attorney, Agent, or Firm*—Kirkpatrick & Lockhart LLP

[57] ABSTRACT

The present invention is directed to an automatic voltage controller for an electrostatic precipitator. The invention maintains a database of operating parameters, such as the firing angle of the silicon controlled rectifiers, during previous breakdowns. The data is used for statistical analysis of the process conditions of the precipitator, enabling the invention to more accurately predict the breakdown level of the system, and providing tolerance of erratic or atypical breakdowns. The invention assembles a "rolling" data set of a predetermined number of previous breakdowns from which the invention continuously extracts a mean value and a standard deviation value, which are used to determine the setback level and the ramp level.

20 Claims, 4 Drawing Sheets

METHOD AND APPARATUS TO REGULATE A VOLTAGE CONTROLLER

BACKGROUND OF THE INVENTION

1. Field of the Invention

The present invention is directed generally to a power supply controller for an electrostatic precipitator, and, more particularly, to a method of regulating a firing angle of thyristors in response to the operating conditions present in the precipitator.

2. Description of the Background

An electrostatic precipitator ("ESP") is a device which removes particulates, either liquids or solids, from a gas stream. A typical use of an ESP is to remove smoke, created by the burning of a fuel, from exhaust gasses.

An ESP contains a high voltage electrode, called an emitting electrode, and a grounded electrode, called a collecting electrode. The emitting electrode is energized to a high negative DC voltage, causing ionization of a portion of the gas stream near the emitting electrode and generating an electrostatic field between the electrodes. The ionization induces a negative charge on the particulates in the gas stream which, in turn, causes them to be drawn towards the collecting electrode, which is usually shaped as a plate or a tube. When the charged particulates strike the collecting electrode, they lose their velocity in the direction of the gas flow, as well as their charge, and they fall along the collecting electrode surface into a hopper or collection tank.

Increasing the potential across the electrodes increases both the charge placed on the particulate matter and the electrostatic field, thereby increasing the effectiveness of the ESP. The maximum potential across the electrodes is limited by sparking and arcing between the electrodes, known as "breakdowns" Breakdowns are undesirable because they discharge the electrodes, greatly decreasing the effectiveness of the ESP, and because they can damage both the ESP and its control system. When breakdowns occur, a highly ionized gas is formed between the electrodes. The ionized gas provides a low resistance path through which the current powering the electrodes flows, discharging the electrodes. Although a breakdown will usually be extinguished by the flow of gasses past the electrodes, a breakdown will often continue unless the power to the electrodes is either reduced or completely shut off.

The point at which a breakdown occurs varies depending on the process conditions within the ESP, such as gas flow velocity, temperature, dust loading, and the types of materials flowing past the electrodes. If those conditions are relatively constant, the breakdown point will be constant, and if they vary, the breakdown point will vary.

ESPs include automatic voltage controllers ("AVCs") which control and attempt to maximize the power applied to the electrodes, while at the same time minimizing the number of breakdowns. AVCs typically are microprocessor-based and programmable, with keyboards, EEPROM memory and communication ports for interface with external control systems or computers.

Examples of AVCs can be found in U.S. Pat. No. 4,860,149, issued to Johnston, and U.S. Pat. No. 4,354,152, issued to Herklotz, et al. AVCs typically control the power to the electrodes by regulating the firing angle of thyristors, which control the flow of AC current into the system. The present technology used in most AVCs to control the firing angle is a "setback and ramp" method. That method measures the firing angle at which the last breakdown occurred, reduces that firing angle by a preset amount or percentage, known as the setback, and then increases the firing angle at a fixed rate, known as the ramp, until the next breakdown occurs.

The AVC regulates the firing angle of thyristors in response to the process conditions in the ESP. The firing angle, determines how much current flows to a primary of a transformer-rectifier set ("TR"), which in turn determines how much high voltage and current is applied to the electrodes. The firing angle is reduced in response to breakdowns, but should otherwise be maintained as high as possible to ensure maximum collection efficiency. The manner in which the firing angle is modulated is critical to how well an ESP operates and how much time it spends quenching breakdowns and at "less than ideal" operating conditions. The perfect ESP would predict the exact breakdown voltage, and then operate just below that level, keeping maximum collection efficiency and preventing a breakdown from occurring. This, however, is not possible because the breakdown point varies continuously with the process conditions. Therefore, the main objective in designing an AVC is to follow the process as closely as possible while minimizing the frequency of breakdowns which disturb that process, decrease efficiency, and which may damage the ESP.

An improvement over the standard setback and ramp method is shown in the Johnston patent, which calculates the ramp required to reach a hypothetical breakdown level in a predetermined time interval so as to maintain a constant spark rate. This feature ensures that the ESP does not operate at a low voltage on a slow ramp for extended periods of time. The drawback to this system, however, is that it forces the electrodes to spark frequently in order to verify the breakdown point. A further drawback to this system is that it requires manual programming, so that an operator must evaluate the load, determine if it is stable or unstable, and select a spark rate which is appropriate. If the operator selects the incorrect spark rate, or if the conditions change and the system is not reprogrammed, the system may run at an inefficient level. Finally, the ramp is calculated with data from only the last breakdown.

Another improvement is shown in the Herklotz et al. patent, in which the AVC counts the number of breakdowns which occur in a predetermined period of time and uses that number to calculate the setback. The system, however, only retains data from the previous breakdown. The previous breakdown voltage is compared with the current breakdown voltage to determine what adjustments, if any, need to be made to the duration of a waiting period before the ramp voltage is applied. Like the method disclosed in the Johnston patent, the Herklotz et al. method requires the electrode to spark frequently and uses data from only the previous breakdown.

The main weakness in both of those methods is that they require the AVC to produce a large number of breakdowns at regular intervals, even when the process is stable, to ensure that the firing angle remains close to the maximum. Another weakness lies in the fact that the setback value and ramp rate are determined by considering the present breakdown and the conditions associated with the previous breakdown. Those types of systems induce unstable responses when, for example, an erratic breakdown occurs. In such a situation, the next setback and ramp values are determined with reference to the erratic breakdown data which is not representative of the true state of the system.

Thus, the need still exists to provide an AVC for an ESP which is immune to sporadic, atypical breakdown data, which reduces the number of breakdowns, and which does not require an operator to set the operating parameters.

SUMMARY OF THE INVENTION

The present invention is directed generally to an automatic voltage controller ("AVC") for an electrostatic precipitator ("ESP"). The invention solves the above-mentioned shortcomings in the prior art by maintaining a database of the operating parameters of the AVC, such as the firing angle of the SCRs, during previous breakdowns. The data is used for statistical analysis of the process conditions of the ESP, enabling the AVC to more accurately predict the breakdown level of the system, and providing tolerance of erratic or atypical breakdowns.

The invention assembles a "rolling" data set of a predetermined number of previous breakdowns from which the invention continuously extracts a mean value and a standard deviation value. The invention adjusts the setback level to be the mean minus the standard deviation, which under stable process conditions causes the setback value to be reduced by a small amount, and under unstable conditions causes the setback value to be reduced by a larger amount. In a similar fashion, the ramp rate is varied proportionally to the ratio of the square of the standard deviation over the mean. This results in long, flat ramps when the process is stable, and shorter, steeper ramps when there is a high degree of instability. The method results in a high overall operating voltage average and significantly less breakdowns under all operating conditions, as compared to known methods of control.

The method is comprised of the steps of detecting a breakdown and reducing the power once a breakdown is detected. The method also includes collecting data associated with the breakdown and adding the data to a database containing data from previous breakdowns. Finally, the method includes restoring the power based on data from a plurality of previous breakdowns.

The invention may be embodied in an AVC comprising circuitry for detecting a breakdown and circuitry for reducing the power once the breakdown is detected. A circuit for collecting data associated with the breakdown, such as the firing angles of the SCRs at the time of the breakdown, is also provided along with circuitry for adding the data to a database. A circuit for restoring the power uses the data in the database to restore the power to an efficient operating level.

BRIEF DESCRIPTION OF THE DRAWINGS

For the present invention to be clearly understood and readily practiced, the present invention will be described in conjunction with the following figures, wherein.

DESCRIPTION OF THE PREFERRED EMBODIMENTS

Figure 1:
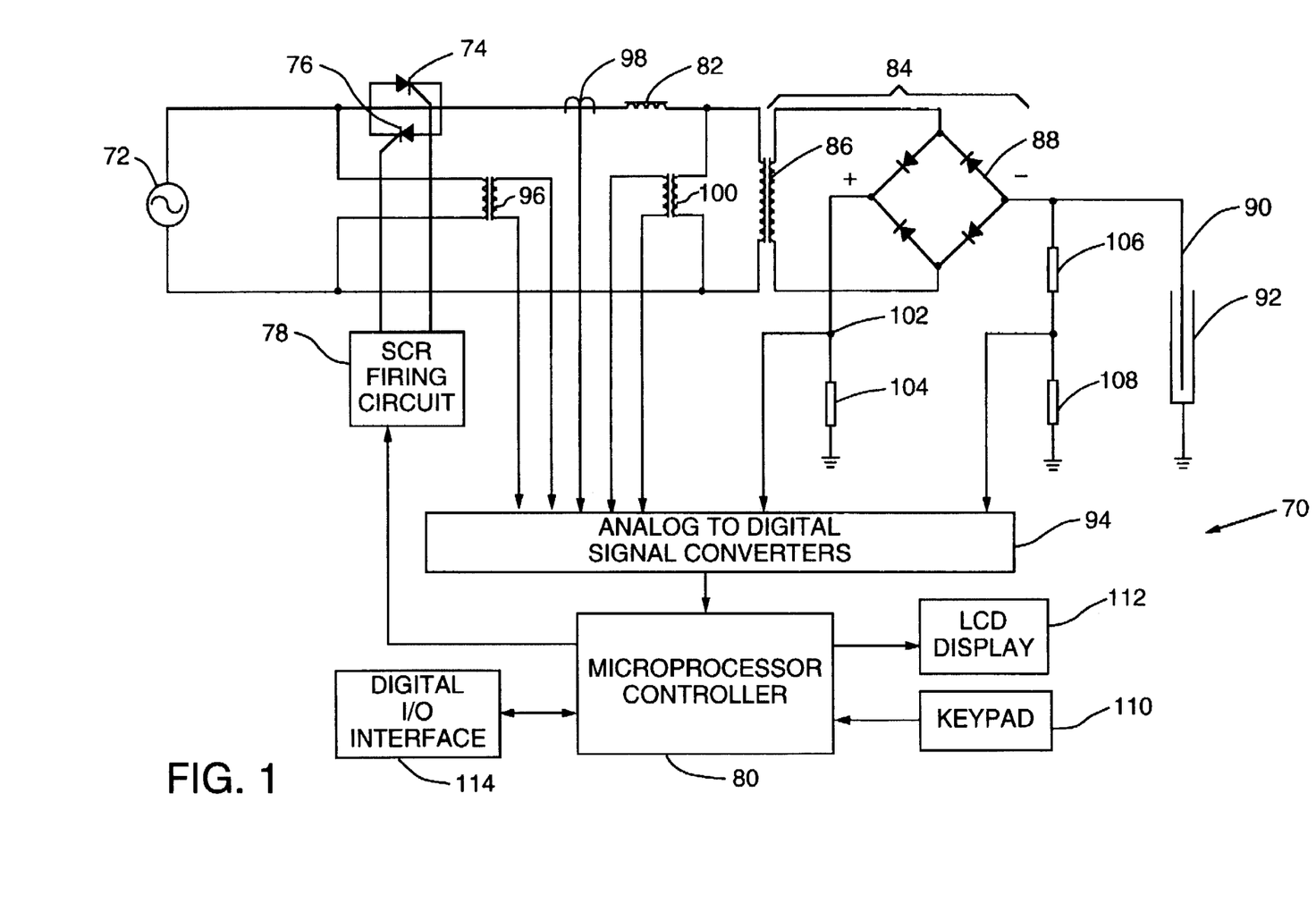
FIG. 1 is a combination circuit diagram and block diagram of a control circuit in accordance with the present invention.

FIG. 1 is a combination circuit diagram and block diagram of an automatic voltage controller ("AVC") 70 controlling the high power electronics which supply power to the electrodes of the precipitator. It is to be understood that FIG. 1 has been simplified to illustrate only those aspects of the circuit 70 relevant for a clear understanding of the present invention, while eliminating, for the purpose of clarity, many of the elements found in a typical ESP. Those of ordinary skill in the art will recognize that other elements are required to produce an operational ESP. However, because such elements are well known in the art, and because they do not further aid in the understanding of the present invention, a discussion of such elements is not provided herein.

The high power electronics receives an AC input 72. The input is typically 480 VAC, 60 Hertz, single phase. The AC voltage is controlled by a pair of anti-parallel thyristors, preferably SCRs 74 and 76. Each SCR 74 and 76 carries half of the current load for the ESP. Although SCRs are typically as high as 99 percent efficient, because of the extremely high power passing through them, heat sinks and cooling fans (not shown) are often required to dissipate the heat.

The SCRs 74 and 76 are triggered by an SCR firing circuit 78. The firing circuit 78 triggers the SCRs 74 and 76 at the appropriate firing angle, as determined by the "execute calculation" shown at step 20 in FIG. 2, and as provided by a microprocessor controller 80.

The controller 80 is preferably a Motorola MC68HC16Z1 microprocessor. The controller 80 reviews all data available to it and performs all of its control functions every half cycle, or 8.33 milliseconds in a 60 Hertz system. The controller 80 calculates the firing angle in accordance with the step 20 shown in FIG. 2 and provides it to the firing circuit 78 every half cycle.

After passing through the SCRs 74 and 76, current proceeds through a current limiting reactor ("CLR") 82. The CLR is typically an iron-core inductor which limits current surges.

The current then proceeds to a transformer-rectifier unit ("TR") 84. The TR 84 comprises a step-up transformer 86 and a bridge rectifier 88. The TR 84 typically accepts an input voltage up to 575 VAC at the primary of the transformer 86, and provide a high voltage direct current at the output of the rectifier 88. The transformer 86 may have a step-up ratio of 1:100, or more, depending on the process and the ESP configuration. Average output voltages range from 45 VDC to over 120 kVDC, with typical currents ranging from 500 mADC to 2,500 mADC. The output of the bridge rectifier 88 provides a high negative voltage to the emitter electrode 90, with the collector electrode 92 grounded.

The controller 80 receives feedback from the circuit through an analog to digital signal converter 94. The converter 94 receives feedback from sensing devices in the circuit. A transformer 96 provides feedback concerning the input voltage 72. A current transformer ("CT") 98 provides feedback concerning the amount of current passing through the SCRs 74 and 76, through the CLR 82 and into the TR 84. The CT is typically sized to deliver five amps when the TR 84 operates at its maximum level. Feedback concerning the voltage across the primary of the transformer 86 is provided by a transformer 100. Current feedback from the output of the rectifier 88 is provided by a voltage 102 across a resistor 104, which is wired in series with the TR 84. The full TR current circulates through the resistor 104 which is sized to create a voltage drop of approximately three volts when the full normal current is applied. Voltage feedback concerning the output of the rectifier 88 is provided by a voltage divider comprising resistors 106 and 108.

Sparks are detected by sensing the change in the voltage across the resistor 104, utilizing a peak detector (not shown) which is set to trigger at an adjustable voltage level based on the previous half cycle average voltage. When the current half cycle average voltage exceeds the previous half cycle average voltage by a predetermined amount, typically between 150% and 350%, and preferably 150%, it is concluded that a spark has occurred.

Arcs are detected by the CT 98 sensing changes in the primary current. An arc is determined to have occurred when the peak primary current exceeds the RMS value of the last half cycle by a predetermined value between 150% and 250%, and preferably 150%.

A second arc detection method is provided for determining an arc which does not provide a current spike that would normally trigger a conventional arc detector. That condition is called a "power arc." A power arc is deemed to exist if the primary current of the transformer 86 exceeds 90% of its current limit, while the secondary voltage remains below 10% of the secondary voltage limit, for a duration of five consecutive half cycles. A power arc detection is treated the same as any other breakdown, except that if a second power arc occurs before the second voltage regains 10% of its limit in the ramp calculation step 20, the ramp calculation step 20 will be repeated and the quench step will automatically be extended by two full cycles. If third and fourth consecutive power arcs occur, each will add two full cycles to the quench time. If a fifth consecutive power arc occurs, the controller 80 will conclude that the electrodes are shorted and will shut down the power via the SCRs 74 and 76.

Zero crossings of the AC voltage source 72 are determined with feedback from the transformer 96.

A keypad 110 is also provided to give access to internal parameters, control options, and configuration features of the controller 80.

Operated in conjunction with the keypad 110 is an LCD display 112. The display 112 provides feedback to an operator, and the keypad 110 and display 112 together eliminate the need for LEDs, thumbwheels, switches, pots, dip switches, and other manual switches and displays, which were typically used in older designs.

Finally, a digital input/output interface 114 is provided to allow the controller 80 to communicate with other devices. The interface 114 is provided with an RS485 communication port, which allows multiple AVCs 70 to be placed on a network for communication with a central processor. The interface 114 also preferably includes multiple relay outputs which are used to operate devices such as circuit breakers, contactors, and remote annunciators. A circuit breaker or contactor may be used to shut down the AVC in the event of a condition such as an SCR short or open, an internal TR short, any of the various alarms, thyristor overtemperature, precipitator shortcircuit, etc. The AVC 70 may also contain features such as intermittent energization and back corona detection.

Figure 2:
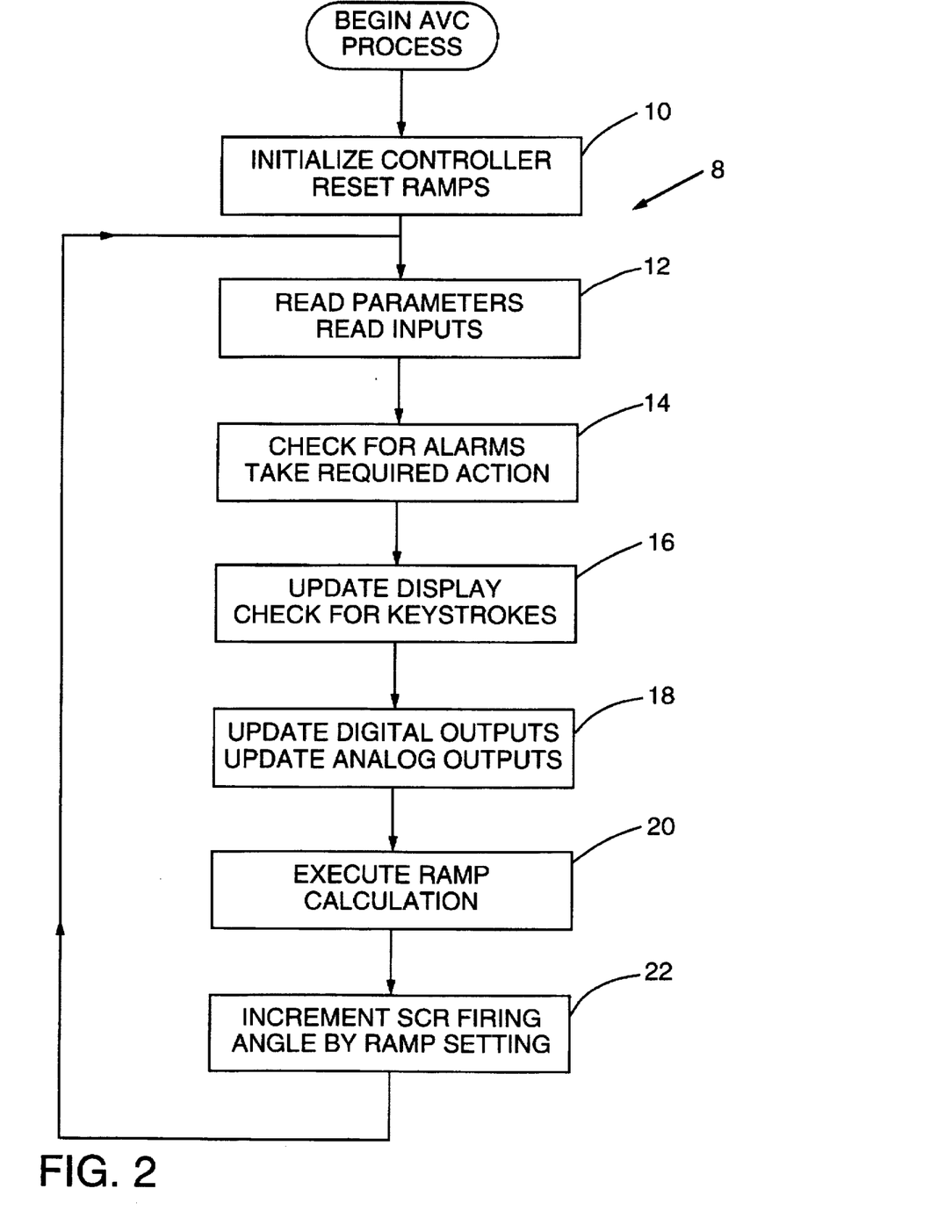
FIG. 2 is a block diagram illustrating the process carried out by the microprocessor controller of FIG. 1 in accordance with the present invention.

FIG. 2 is a high-level block diagram illustrating the process carried out by AVC 70 in accordance with the present invention. The process 8 comprises the step 10 of initializing the controller 18 and resetting ramps; the step 12 of reading parameters and inputs; the step 14 of checking for alarms and taking any required action; the step 16 of updating a display and checking for keystrokes; the step 18 of updating digital and analog outputs; the step 20 of executing a ramp calculation; and the step 22 of incrementing an SCR firing angle by a ramp setting. With the exception of the ramp calculation step 20, which is described in detail below, the process steps shown in FIG. 2 are well known in the art, and because they do not relate to the process and apparatus which are the subject of the present invention, a discussion of such elements is not provided herein.

Figure 3:
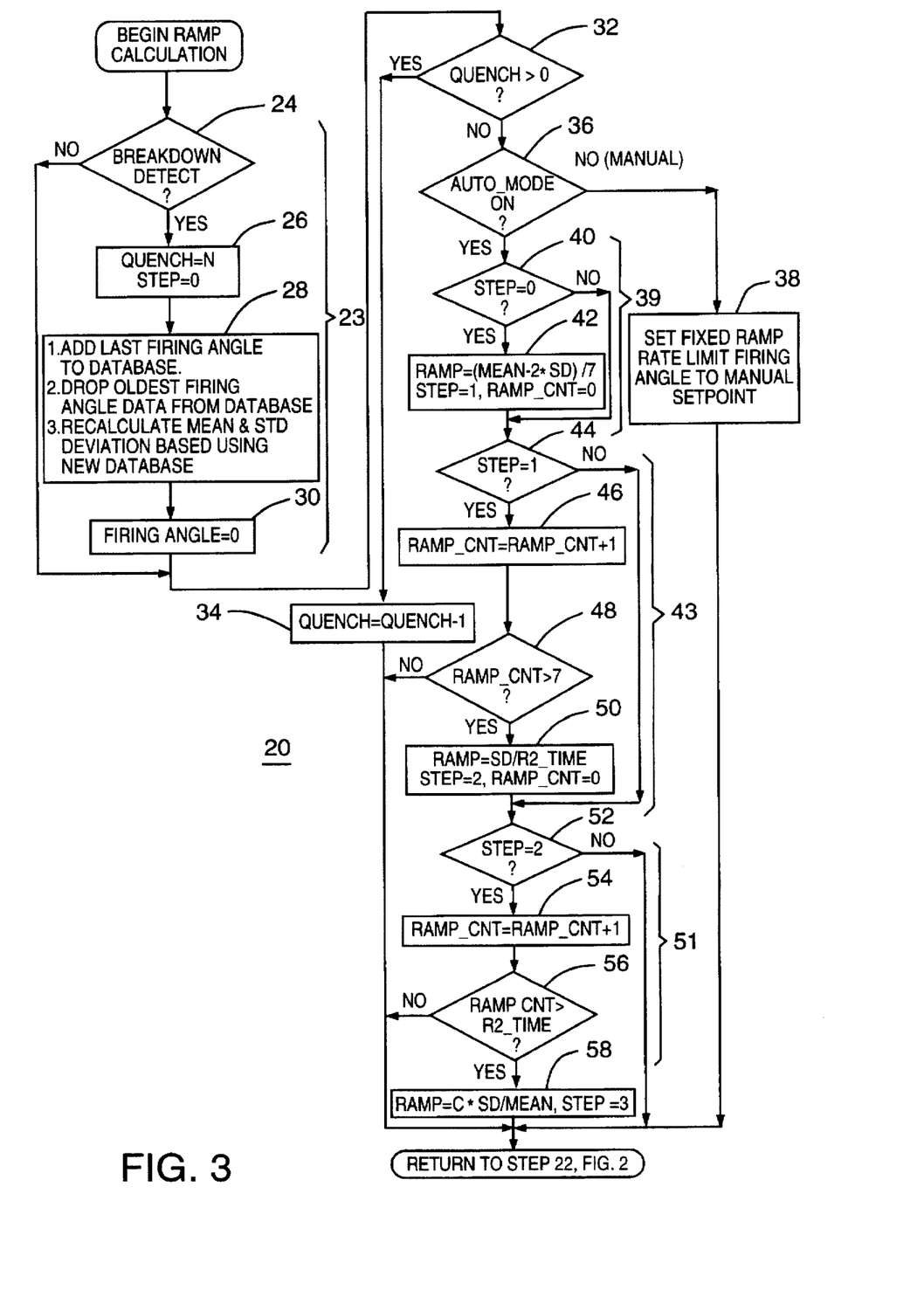
FIG. 3 is a block diagram illustrating the details of step 20 illustrated in FIG. 2.

FIG. 3 is a block diagram illustrating the ramp calculation step 20 illustrated in FIG. 2. The calculation step 20 utilizes a database containing SCR firing angles at past breakdowns. The database preferably contains the firing angles of the SCRs at the previous ten breakdowns, and is used for statistical analysis of the process conditions of the ESP, enabling the AVC to more accurately predict the breakdown level of the system, and providing tolerance of erratic or atypical breakdowns. There are several parameters, such as current and voltage, that may be controlled by an AVC and measured during a breakdown. Current and voltage vary depending on the process conditions, however, while the SCR firing angle does not. As a result, the SCR firing angle is the preferred control parameter both in the industry and in the present invention because it is most easily controlled. The measurement and control of any parameter, however, will work with the present invention.

At the beginning of the ramp calculation step 20 is a breakdown portion 23 where it is determined at step 24 whether a breakdown has been detected. If a breakdown has not been detected, the process proceeds to the end of the breakdown portion 23. If a breakdown has been detected, the process proceeds to step 26 where a variable QUENCH is set equal to a value N. QUENCH is used as a counter to ensure that the power to the electrodes is reduced for the proper number of half cycles. N is a preset integer value, and preferably is an even integer value, representing a number of half cycles required to quench a breakdown. Typical values for N are two through four for spark breakdowns and four through ten for arc breakdowns. The value of N is usually dependant on process conditions, and in particular the gas flow velocity. In general, the lower the gas flow velocity, the more time is needed to quench a breakdown. In step 26 the ramp calculation step 20 also initializes a variable STEP equal to zero. STEP is used to keep track of which steps in the ramp calculation step 20 have been completed. When STEP equals zero, the breakdown portion 23 has been entered. From step 26 the process proceeds to step 28.

In step 28 the process updates the database maintained by microprocessor controller 80. The firing angle of the SCRs at the time of the breakdown is added to the database, the oldest firing angle value is deleted from the database, and Mean and Standard Deviation values are calculated based on the new values in the database. Finally, the process proceeds to step 30 where the firing angle for the SCRs is reset to zero.

Following the initialization portion 23 is step 32 where it is determined whether QUENCH is greater than zero. As long as the value of QUENCH is greater than zero at step 32, the process will decrement QUENCH by one in step 34 and exit to the AVC process 8 shown in FIG. 2.

Once QUENCH is zero at step 32, the process proceeds to step 36 and determines whether the ESP is set in automatic mode. If the ESP is not set in automatic mode, then it is in manual mode and the process proceeds to step 38 where it sets a fixed ramp rate and limits the firing angle of the SCRs to a setting determined by values set by an operator. Thereafter, the process returns to the AVC process 8. As long as the ESP is set in manual mode, the ramp calculation step 20 will always default to the manually set ramp rate and setback values in step 38.

If the ESP is in automatic mode, then the process will proceed from step 36 to an initialization portion 39 and step 40. If STEP is not zero at step 40, then the process skips to the end of the initialization portion 39 because initialization has already occurred. If STEP is zero at step 40, then initialization begins and the process proceeds to step 42 where a variable RAMP is set to, for example:

RAMP=Mean−(2*Standard Deviation)/7.

RAMP is the rate at which the firing angles are incremented each half cycle in the increment step 22 of FIG. 2. As a result, the slope of the firing angles is equal to the value of RAMP. A ramp counter, RAMP_CNT, is initialized to zero and used to count the number of half cycles the firing angles have been incremented by the value of RAMP. Thereafter, the value of STEP is changed to one to indicate that RAMP and RAMP_CNT have been initialized.

The ramp calculation step 20 then proceeds to a first ramp portion 43 of the process and step 44. The first ramp portion 43 is a transition step to prevent an initial current surge from inducing another breakdown. If the firing angle is increased at a rapid rate, a current surge will occur which may induce another breakdown, even at a point significantly below the normal breakdown point. It has been found that if the firing angle is set to the setback value in a single half cycle, breakdowns may be induced. The preferred method of reaching the setback value is described below.

If STEP is not equal to one at step 44, the first ramp has been completed and the process skips to the end of the first ramp portion 43. If STEP is equal to one, then the first ramp has not been completed and the process continues to step 46 where RAMP_CNT is incremented by one, and then to step 48. The process will exit the ramp calculation step 20 and return to the AVC process 8, where the firing angle of the SCRs will be incremented in step 22 by the amount RAMP (see FIG. 2), if RAMP_CNT is less than seven at step 48. As long as RAMP_CNT is less than seven, each time through the process RAMP_CNT will be incremented by one in step 46 and then at step 48 will return to the AVC process 8. That will occur seven times, until RAMP_CNT is greater than seven. After seven half cycles, the firing angle will have achieved a value of:

firing angle=Mean−(2*Standard Deviation).

At that point the first ramp is complete and the process will proceed from step 48 to step 50 in which a new RAMP value is set, so that, for example:

RAMP=Standard Deviation/R2_TIME.

R2_TIME is a preset integer representing a time duration for a second ramp, and R2_TIME is preferably 113 half cycles. The duration of R2_TIME, however, is largely arbitrary and may be changed to suit the needs of the user. In the preferred embodiment, it was desired that the durations of the first and second ramps totaled 120 half cycles, or one second, in a 60 Hertz system. Also in step 50, RAMP_CNT is reset to zero for use with the second ramp, and the value of STEP is changed to two in step 50 to represent the fact that the first ramp has been completed.

The process then leaves the first ramp portion 43, and enters the second ramp portion 51 and step 52. The second ramp portion 51 returns the firing angle to the setback value, preferably the Mean minus the Standard Deviation.

If STEP is not equal to two at step 52, the second ramp has been completed and the process skips to the end of the second ramp portion 51. If STEP is equal to two at step 52, then the second ramp has not been completed and the process proceeds to step 54, increments the RAMP_CNT, and continues to step 56. If RAMP is less than R2_TIME at step 56, the process will exit to the AVC process 8. As long as RAMP_CNT is less than R2_TIME at step 56, each time through the ramp calculation step 20, RAMP_CNT will be incremented by one in step 54 and when the process reaches step 56 it will exit and return to the AVC process 8, where the firing angle of the SCRs will be incremented in step 22 by the amount RAMP (see FIG. 2). That will occur R2_TIME times, until RAMP_CNT is greater than R2_TIME. After R2_TIME half cycles, the firing angle will have a value of:

firing angle=Mean−Standard Deviation.

After seven half cycles in the first ramp portion 43, and 113 half cycles in the second ramp portion 51, the firing angle will have reached the setback value in 120 half cycles, or one second in a 60 Hertz system. Likewise, in a 50 Hertz system the duration of the first ramp may be set at seven half cycles and the duration of the second ramp set at 93 half cycles, for a total of 100 half cycles or one second.

At that point the second ramp is complete, the setback value has been reached, and the process proceeds from step 56 to step 58 where a final RAMP value is set, so that, for example:

RAMP=C*(Standard Deviation)$^2$/Mean.

C is a constant that is selected so that the firing angles will reach an expected breakdown point between one second and 120 seconds after the setback point was reached, depending on the stability of the system. The expected breakdown point is defined, for example, as the average of the breakdown points for the last ten breakdowns. The stability of the system is measured as a ratio:

STABILITY=Mean/Standard Deviation.

If STABILITY is greater than 50, then the system is considered very stable and C is set to have the ramp reach the expected breakdown point in, for example, 120 seconds. If STABILITY is less than 5, then the system is considered very unstable and C is set to have the ramp reach the expected breakdown point in, for example, one second. The relationship between STABILITY and C may be linear, so that for STABILITY values between five and fifty, the value of C is easily calculated.

Also in step 56, the value of STEP is changed to three to indicate that the process has proceeded to the final ramp step 58.

Thereafter, the process exits the ramp calculation step 20 and returns to the AVC process 8 where the firing angle of the SCRs will be incremented in step 22 by the amount RAMP (see FIG. 2). With the final ramp setting, the process continues until a breakdown occurs. As long as a breakdown does not occur, when the AVC process 8 accesses the ramp calculation step 20, no changes occur. The ramp calculation step 20 will determine, at step 24, that a breakdown has not occurred, and it will proceed to the end of the breakdown portion 23. Because a breakdown has not occurred, a quench is not necessary, and the process proceeds from step 32 to step 36. Assuming that the ESP is in automatic mode, the process proceeds from step 36 to step 40. Because a breakdown has not occurred, it is not necessary to initialize the ramp, so the process proceeds from step 40 to step 44. Once again, because a breakdown has not occurred, it is not necessary to proceed through the first ramp portion second ramp portion 51, or final ramp step 58. As a result, the process proceeds from step 44 to step 52, and from step 52 the process returns to the AVC process 8 where the firing angle of the SCRs will be incremented in step 22 by the amount RAMP (see FIG. 2). When a breakdown does occur, the entire process will repeat itself.

When the AVC 70 is first activated, the firing angle of the SCRs is slowly increased until a breakdown or full conduction occurs, followed by the setback and ramp process. That is repeated five times to "prime" the database.

Figure 4:
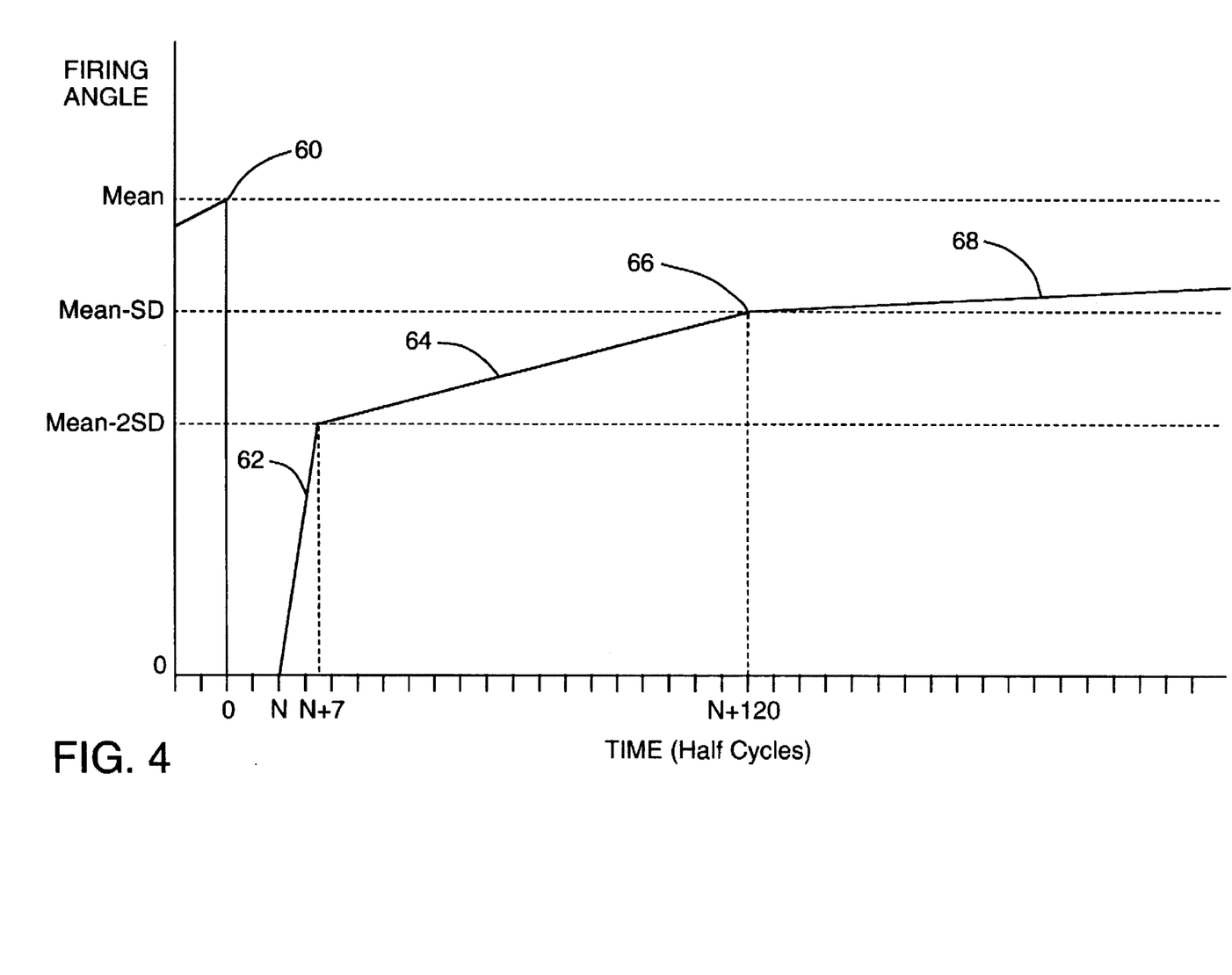
FIG. 4 is a graph showing SCR firing angle versus time, as measured in half-cycles, during and after a breakdown.

FIG. 4 shows a graph of an SCR's firing angle plotted versus time, as measured in half cycles, following a breakdown 60. FIG. 4 graphically illustrates the process described in FIG. 3. After the breakdown 60, the firing angle is reset to zero as described in step 30 of FIG. 3. The firing angle remains at zero for N half cycles, while the breakdown is being quenched, as in steps 32 and 34 of FIG. 3.

After the quench is complete, the first ramp 62 is started. In seven half cycles, the first ramp 62 advances the firing angle from zero to a value equal to:

firing angle=Mean–(2*Standard Deviation).

The second ramp 64 follows the first ramp 62. In 113 half cycles, the second ramp 64 advances the firing angle to the setback value 66, which is equal to a value of:

firing angle=Mean–Standard Deviation.

The first ramp 62 and second ramp 64 are completed in 120 half cycles, or one second in a 60 Hertz system.

Once the setback value 66 is reached, the ramp value 68 is set to:

RAMP=C*(Standard Deviation)$^2$/Mean.

C is the constant defined above.

Thereafter, the firing angles of the SCRs are increased at the RAMP rate 68 until another breakdown occurs.

Those with ordinary skill in the art will recognize that many modifications and variations of the present invention may be implemented. For example, the first ramp 62, the second ramp 64, and the final ramp 68 may be approximated by a smoothly varying ramp, instead of three linear ramp rates. In such an embodiment, the smoothly varying ramp rate may start with the first ramp rate, move into the second ramp rate, and finish at the final ramp rate. In addition, the invention may be utilized in an arc welder. Instead of quenching breakdowns, however, the invention will be adapted to maintain and control breakdowns at a desired level in an arc welder. The foregoing description and the following claims are intended to cover all such modifications and variations.

What is claimed is:

1. A method of controlling electrical power in a device subject to electrical breakdowns, comprising the steps of:
   detecting a breakdown;
   reducing the power after the breakdown is detected;
   collecting data associated with the detected breakdown;
   adding the collected data associated with the detected breakdown to a database; and
   restoring the power based on the collected data and data from a plurality of previous breakdowns.

2. The method of claim 1, wherein the step of restoring the power includes:
   calculating a setback value;
   calculating a final ramp rate;
   setting the power at the setback value; and
   increasing the power at the final ramp rate.

3. The method of claim 2, wherein the step of setting the power includes calculating a mean of the data in the database minus a standard deviation of the data in the database.

4. The method of claim 2, wherein the step of increasing the power includes calculating a square of a standard deviation of the data in the database, divided by a mean of the data in the database.

5. The method of claim 2, wherein the step of setting the power comprises the steps of:
   calculating a first ramp rate;
   calculating a second ramp rate;
   increasing the power to less than the setback value at the first ramp rate; and
   increasing the power from less than the setback value to the setback value at the second ramp rate.

6. The method of claim 5, wherein the step of calculating the first ramp rate includes calculating a mean of the data in the database minus twice a standard deviation of the data in the database, divided by seven half cycles.

7. The method of claim 5, wherein the step of calculating the second ramp rate includes calculating a standard deviation of the data in the database divided by 113 half cycles.

8. The method of claim 1, wherein the step of collecting data includes determining a firing angle of a thyristor.

9. The method of claim 1, wherein the step of reducing the power lasts between two and ten half cycles.

10. The method of claim 1, further comprising the step of maintaining data in the database from the ten most recent breakdowns.

11. An automatic voltage controller for controlling electrical power in a device subject to electrical breakdowns, comprising:
    means for detecting a breakdown;
    means for reducing power after the breakdown is detected;
    means for collecting data associated with the breakdown;
    means for adding the collected data associated with the breakdown to a database; and
    means for restoring the power based on the collected data and data from a plurality of previous breakdowns.

12. The controller of claim 11, wherein said means for controlling the power comprises a microprocessor.

13. The controller of claim 12, wherein said means for reducing the power and said means for controlling the power comprise a pair of anti-parallel thyristors.

14. The controller of claim 13, wherein said thyristors are SCRs.

15. The controller of claim 14, wherein said data comprises firing angles of said SCRs when the breakdown occurred.

16. The controller of claim 11, wherein said means for restoring the power includes means for calculating a setback value and means for calculating a final ramp rate.

17. The controller of claim 16, wherein the means for calculating the setback value includes means for calculating a mean minus the standard deviation of the data in the database.

18. The controller of claim 16, wherein the means for calculating the final ramp rate includes means for calculating the square of the standard deviation of the data in the database, divided by the mean of the data in the database.

19. A method of controlling electrical power in a device subject to electrical breakdowns, comprising the steps of:

detecting a breakdown;

collecting data associated with the detected breakdown;

adding the collected data associated with the detected breakdown to a database; and controlling the power based on the collected data and data from a plurality of previous breakdowns.

20. The method of claim 19, wherein the step of controlling further includes the step of performing a statistical analysis.

* * * * *